United States Patent
Andre et al.

(10) Patent No.: US 9,817,127 B2
(45) Date of Patent: Nov. 14, 2017

(54) METHOD FOR DETERMINING THE POSITION AND/OR SPEED OF A GUIDED VEHICLE AND ASSOCIATED SYSTEM

(71) Applicant: Alstom Transport SA, Levallois-Perret (FR)

(72) Inventors: Brice Andre, Couillet (BE); Mauro Bortolotto, Chatelineau (BE)

(73) Assignee: ALSTOM TRANSPORT SA, Levallois-Perret (FR)

( * ) Notice: Subject to any disclaimer, the term of this patent is extended or adjusted under 35 U.S.C. 154(b) by 605 days.

(21) Appl. No.: 14/276,266

(22) Filed: May 13, 2014

(65) Prior Publication Data

US 2014/0333478 A1    Nov. 13, 2014

(30) Foreign Application Priority Data

May 13, 2013   (FR) ..................... 13 54268

(51) Int. Cl.
  *G01S 19/28* (2010.01)
  *G01S 19/20* (2010.01)
  *G01S 19/22* (2010.01)

(52) U.S. Cl.
  CPC .............. *G01S 19/28* (2013.01); *G01S 19/20* (2013.01); *G01S 19/22* (2013.01)

(58) Field of Classification Search
  CPC ........... G01S 19/28; G01S 19/20; G01S 19/50
  See application file for complete search history.

(56) References Cited

U.S. PATENT DOCUMENTS

| | | | |
|---|---|---|---|
| 5,808,581 A | 9/1998 | Braisted et al. | |
| 5,867,122 A * | 2/1999 | Zahm | G01S 19/14 342/357.33 |
| 5,977,909 A * | 11/1999 | Harrison | G01S 5/0027 342/357.33 |
| 7,966,126 B2 * | 6/2011 | Willis | B61L 25/025 340/988 |
| 2004/0064222 A1 * | 4/2004 | Laurichesse | G01S 19/50 701/13 |
| 2010/0283670 A1 | 11/2010 | Toda | |

FOREIGN PATENT DOCUMENTS

| | | | | |
|---|---|---|---|---|
| FR | 2 956 215 | | 8/2011 | |
| FR | 2956215 | * | 8/2011 | ............. G01S 15/93 |

* cited by examiner

*Primary Examiner* — Gregory C Issing

(74) *Attorney, Agent, or Firm* — Davidson, Davidson & Kappel, LLC

(57) ABSTRACT

A method for selecting usable satellites from among the satellites of a localization constellation, to determine an instantaneous kinematic state of a train, is provided. The method includes determining a measured value and an estimated value of a Doppler coefficient and/or a pseudo-range, then comparing the measured and estimated values and, in case of divergence, deleting the satellite from the usable satellites. The estimated value results from a dynamic model of the train, which uses only a kinematic state at a past moment to calculate an estimated instantaneous kinematic state and that uses a mapping of the track on which the guided vehicle moves.

4 Claims, 3 Drawing Sheets

METHOD FOR DETERMINING THE POSITION AND/OR SPEED OF A GUIDED VEHICLE AND ASSOCIATED SYSTEM

This claims the benefit of French Patent Application FR 13 54268, filed May 13, 2013 and hereby incorporated by reference herein.

The invention relates to the field of methods and systems for determining the instantaneous kinematic state of a guided vehicle.

In the present application, a guided vehicle refers to any type of vehicle forced to travel along a track, for example such as a train, tram, subway, etc.

Kinematic state refers to the position of the vehicle, the speed of the vehicle, or both.

BACKGROUND

Document EP 1,712,930 B1 discloses a method for determining the instantaneous speed of a train implemented by an onboard system.

This system executes an algorithm for calculating the instantaneous value of the speed of the train from six possible pairs of localization signals emitted by a group of four satellites belonging to a constellation of localization satellites.

In this prior art method, in order to the measurement of the measured quantity have a high confidence level, a preliminary method selects four satellites whose signals will be used by the calculation algorithm. This selection is made from among all of the satellites in the constellation that are visible by the onboard system at the current moment.

The selection method is used to set aside a visible satellite whose signal is incorrect or altered upon reception. This is for example the case when a signal is reflected by the environment before being received. Such a disruption of the signal is called an "alternative path phenomenon". In fact, when a signal disrupted in this way is used by the calculation algorithm, the instantaneous value of the calculated speed is erroneous.

In order to detect that a signal has been disrupted, the system described in document EP 1,712,930 B1 includes two remote receivers. Once a difference appears between the signals coming from a same satellite but received by each of the two receivers, the satellite in question is excluded from the list of usable satellites in determining the speed of the train. This exclusion is maintained for a predetermined length of time, corresponding to an estimate of the time necessary for the train to pass through a disruption area.

Four satellites from the list of usable satellites are next chosen at random to execute the calculation algorithm.

In this way, it is ensured that the four localisation signals used by the calculation algorithm are not disrupted and that the execution of the calculation algorithm will lead to obtaining a measurement of the desired kinematic quantity.

Document FR 2,956,215 A1 discloses a method for selecting satellites usable to determine the kinematic state of a motor vehicle, of the type including the following steps:

calculating a measured instantaneous value of a quantity from among a Doppler coefficient and a pseudo-range, from signals received from a plurality of satellites in a constellation of localization satellites;
determining an estimated instantaneous value of the quantity;
comparing the measured and estimated instantaneous values; and, in case of significant difference,
identifying at least one satellite whose signal is at the origin of the erroneous measured instantaneous value and deleting the at least one satellite from the list of usable satellites.

In document FR 2,956,215 A, the step for determining the estimated instantaneous value is based on a model of the dynamic behavior of the motor vehicle. As input data, this model uses a plurality of measured data delivered by various kinematic sensors equipping the motor vehicle. In particular, in one favored embodiment, the motor vehicle has an onboard inertial unit capable of delivering instantaneous values of the speed and position of the motor vehicle. Then, from that estimated instantaneous state of the motor vehicle, an algorithm calculates the estimated instantaneous value of the quantity of interest, Doppler coefficient and/or pseudo-range.

SUMMARY OF THE INVENTION

The invention aims to propose an alternative selection method that is particularly well suited to the specific case of guided vehicles.

To that end, a method for selecting a set of usable visible satellites from among a set of visible satellites of the constellation of localization satellites, to determine an instantaneous kinematic state of a guided vehicle. The method includes steps consisting, for each satellite of the set of visible satellites, of:

calculating a measured instantaneous value of a quantity from among a Doppler coefficient and a pseudo-range, from the signal received from the visible satellites;
determining an estimated instantaneous value of the quantity;
comparing the measured and estimated instantaneous values according to a criterion, and in case of noncompliance with the criterion;
deleting the satellite from a set of usable visible satellites, characterised in that the step for determining an estimated value of the quantity implements a dynamic model of the guided vehicle that uses only a kinematic state of the guided vehicle determined at a past moment to calculate an estimated instantaneous kinematic state and that uses a mapping of the track on which the guided vehicle moves.

According to particular embodiments, the method includes one or more of the following features, considered alone or according to all technically possible combinations:

the step for determining an estimated value of the quantity uses an ephemeris making it possible to estimate the position and the relative speed of a satellite from the set of visible satellites and the guided vehicle in the estimated instantaneous kinematic state;
the comparison step includes a determination of a deviation between the measured and estimated instantaneous values of the quantity and/or a determination of a covariance between the measured and estimated instantaneous values of the quantity;
the criterion consists of verifying that the deviation is smaller than a threshold deviation and/or that the covariance is below a threshold covariance.

The invention also relates to a method for calculating an instantaneous kinematic state of a guided vehicle from signals emitted by a set of satellites from a constellation of localisation satellites, characterized in that the method begins with a selection method according to the preceding method so as to generate a set of usable visible satellites and in that the method continues with the calculation of the instantaneous kinematic state of the guided vehicle only from signals emitted by the satellites from the list of usable visible satellites.

The invention also relates to a system for determining an instantaneous kinematic quantity of a guided vehicle, onboard the vehicle, including a receiver for the signals emitted by the satellites from a constellation of localisation satellites, a storage and calculator, characterised in that it is capable of executing the instructions of a computer program to implement a method for calculating an instantaneous kinematic state according to the preceding method.

BRIEF DESCRIPTION OF THE DRAWINGS

The invention and its advantages will be better understood upon reading the following description, provided solely as an example and done in reference to the appended drawings, in which.

DETAILED DESCRIPTION

One embodiment of the selection method and a system making it possible to implement that method making it possible to filter the disrupted localization signals will now be described in detail.

Figure 1:
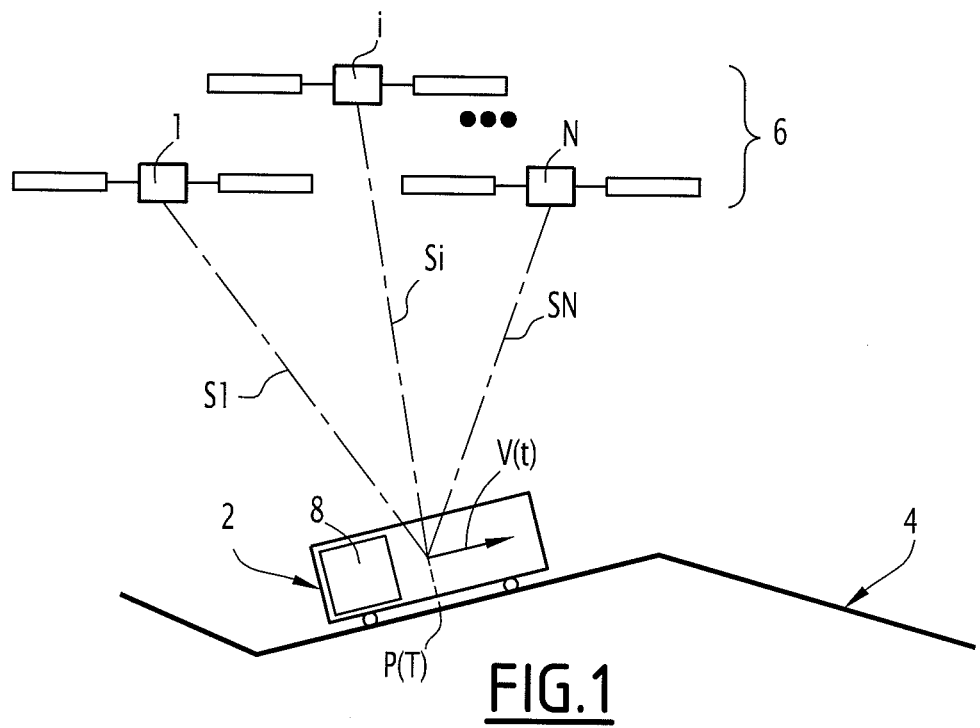
FIG. 1 is a diagrammatic illustration of a train equipped with an onboard system for determining an instantaneous kinematic state, from signals emitted by a constellation of localization satellites.

In reference to FIG. 1, a train 2 travels along a railroad track 4, the path of which is known.

To determine an instantaneous kinematic state E(t), which includes the instantaneous position P(t) and the instantaneous speed V(t) of the train 2, the latter is equipped with an onboard system 8.

The system 8 is capable of receiving localization signals Si emitted by different satellites i belonging to a same constellation 6 of localization satellites.

One example of such a constellation of satellites is that of the GPS (global positioning system) constellation made up of approximately thirty NAVSTAR satellites.

Based on the current moment t and the position P(t) of the train 2 at the current moment t, N satellites i are visible by the system 8. In other words, the system 8 of the train 2 receives the localization signal Si emitted by each of those N satellites i.

Figure 2:
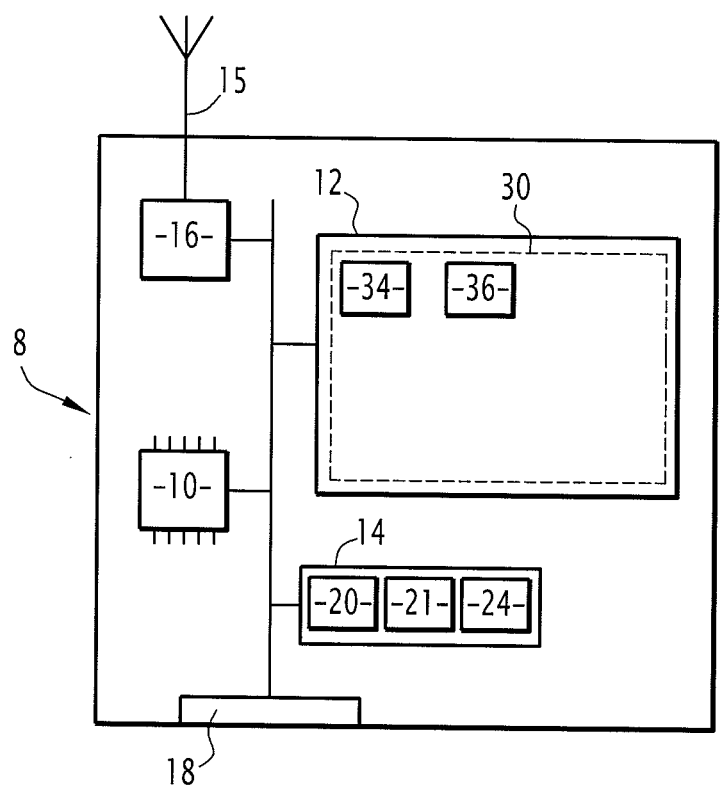
FIG. 2 is an illustration in block form of the structure of the system of FIG. 1.

As shown diagrammatically in FIG. 2, the system 8 is a computer that includes a calculator, such as a processor 10, a storage, such as a random-access memory 12, and a database 14, a module 16 for receiving signals emitted by satellites from the constellation 6 (the module 16 being connected to an antenna 15), and an input-output interface 18, allowing the exchange of data between the system 8 and other systems onboard the train 2.

The various component elements of the system 8 are connected to each other by an internal communication bus.

The memory 12 stores the instructions for different computer programs, which can be executed by the processor 10.

In particular, the memory 12 stores the instructions of a program for implementing the method for selecting visible satellites.

The database 14 stores an almanac 20. An almanac 20 is updated periodically by the constellation 6. It has a validity duration t0 between a first moment t1 and a second moment t2. The almanac 20 is transmitted to the ground as part of the useful load of each of the localization signals Si emitted by the satellites i.

The reception module 16 of the system 8 is capable of identifying the almanac part 20 in a received signal and recording it in the database 14. The almanac 20 allows the system 8 to determine the set of satellites of the constellation 6 that are potentially visible between moments t1 and t2 from any point on the Earth's surface.

The database 14 also stores an ephemeris 21 for each visible satellite. An ephemeris 21 is updated periodically by the constellation 6. It has a validity duration t3 between a first validity moment t4 and a second validity moment t5. The ephemeris 21 is transmitted to the ground as part of the useful load of the localization signal Si transmitted by the corresponding satellite i.

The reception module 16 of the system 8 is capable of identifying the ephemeris part 21 in a received signal and recording it in the database 14. The ephemeris 21 allows the system 8 to determine a position, a speed and time errors of the corresponding satellite.

The database 14 stores a mapping 24 of the track 4 along which the train 2 travels.

The memory 12 includes the instructions of a program 30 for determining the instantaneous kinematic state E(t) of the train 2 at the current moment t.

The program 30 includes a selector 34 capable of delivering a list of useful visible satellites LSVU and a calculator 36 for calculating the instantaneous kinematic state E(t) from the list of usable visible satellites LSVU.

Figure 3:
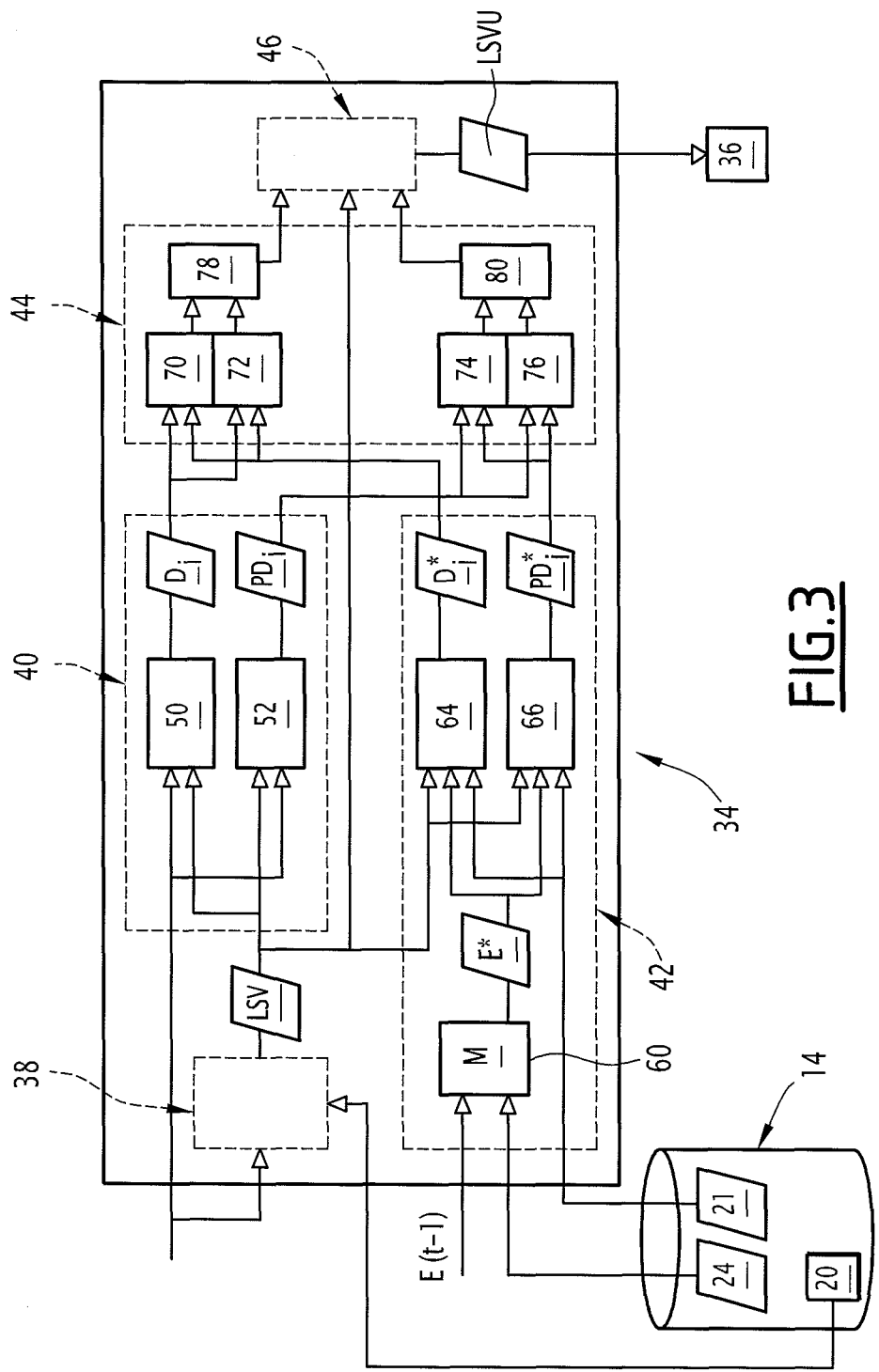
FIG. 3 is an illustration in block form of a selector for selecting a list of usable visible satellites with which the system of FIG. 2 is equipped.
Figure 4:
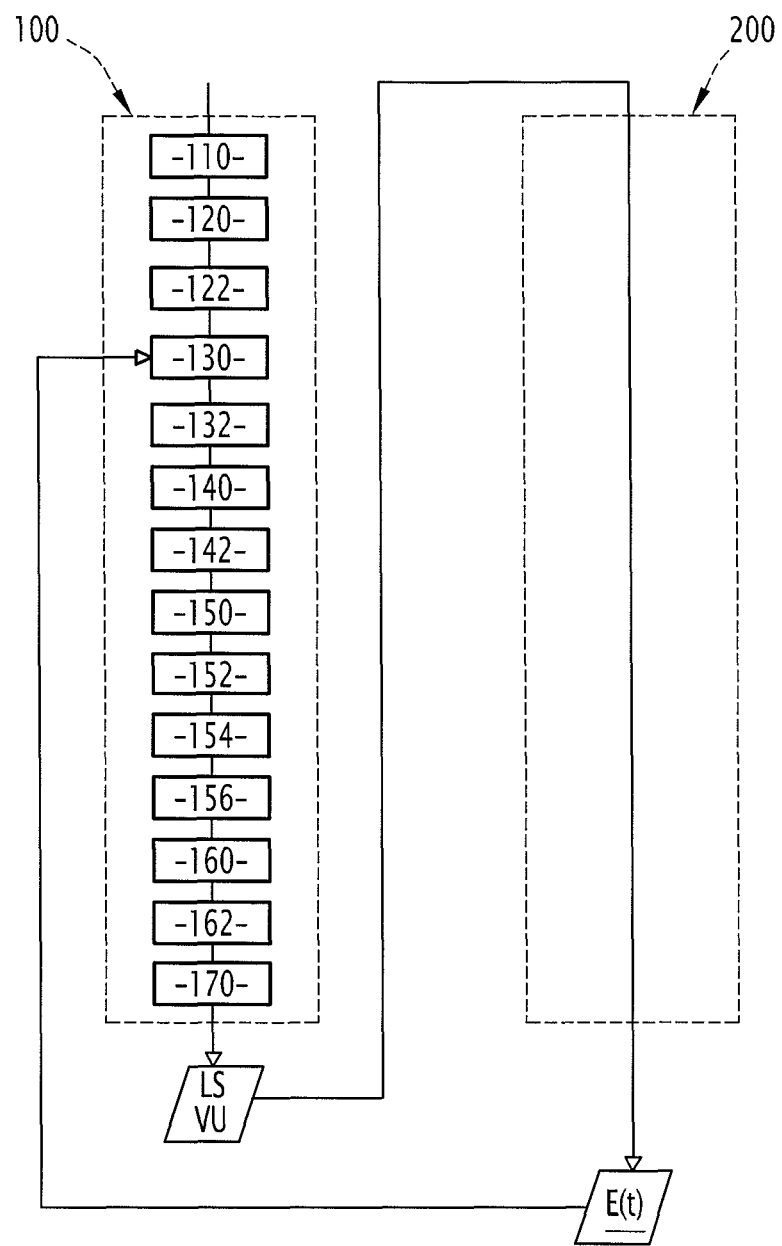
FIG. 4 is a block illustration of the selection method implemented by the selector of FIG. 3.

As shown in detail in FIG. 3, the selector 34 include a module 38 for updating a list of visible satellites LSV, a module 40 for measuring at least one quantity, a module 42 for estimating the at least one quantity, a comparison module 44, and a module 46 for updating a list of usable visible satellites LSVU.

The module 38 for updating a list of visible satellites LSV is capable of keeping an instantaneous list up to date indicating the identifier i of each of the visible satellites, as indicated by the reception module 16.

The measuring module 40 includes a calculation sub-module 50 capable of calculating, for each satellite i of the list LSV, a measured instantaneous value Di of the Doppler coefficient, from the signal Si emitted by that satellite.

The measured module 40 includes a sub-module 52 capable of calculating, for each satellite i from the list LSV, a measured instantaneous value PDi of the pseudo-range, from the signal Si emitted by that satellite.

The estimator 42 includes a sub-module 60 for estimating the current kinematic state. The sub-module 60 is capable of using, as input, the kinematic state E(t−1) of the train 2 determined at the preceding moment t−1, generated at the output of the calculator 36 for the preceding moment t−1.

The sub-module 60 is capable, from the mapping 24 contained in the database 14 and based on the kinematic state at the preceding moment E(t−1), of extracting information relative to a track portion on which the train travels between t−1 and t.

The sub-module 60, which includes a dynamic model M of the behavior of the train 2, is capable, from the kinematic state E(t−1) and information relative to the track portion on which the train 2 is traveling, of determining an estimated kinematic state E*(t) of the train at the current moment t.

In one particular embodiment, the dynamic model M of the behavior of the train 2 used by the sub-module 60 considers that the train is traveling at a constant acceleration. The new kinematic state E(t) of the train is therefore estimated by using the mapping 24 to determine the new position of the train, by extrapolating the movement of the train at a constant acceleration from the preceding kinematic state E(t−1). By taking slow speed variations of a rail vehicle into account, this very rudimentary dynamic model provides good estimates of the actual kinematic behavior of the train over the considered time intervals.

The estimator 42 includes a sub-module 64 capable of calculating, for each satellite i from the list LSV, an estimated instantaneous value D*i of the Doppler coefficient. To that end, the sub-module 64 considers the instantaneous positions of the satellites Si, indicated in the ephemeris 21 stored in the database 14, and the estimated position P*(t) indicated in the estimated kinematic state E*(t) of the train at the current moment t.

The estimator 42 includes a sub-module 66 capable of calculating, for each satellite i from the list LSV, an estimated instantaneous value PD*i of the pseudo-range. To that end, the sub-module 66 considers the instantaneous positions of the satellites Si, indicated in the ephemeris 21 stored in the database 14, and the estimated position P*(t) indicated in the estimated kinematic state E*(t) of the train at the current moment t.

The comparison module 44 includes a sub-module 70 for determining a deviation ΔDi between the measured and estimated instantaneous values Di and D*i of the Doppler coefficient for the satellite i.

The comparison module 44 includes a sub-module 72 for determining a covariance CovD between the measured and estimated instantaneous values Di and D*i of the Doppler coefficient for the satellite i.

The comparison module 44 includes a sub-module 74 for determining a deviation ΔPD between the measured and estimated instantaneous values PDi and PD*i of the pseudo-range for the satellite i.

The comparison module includes a sub-module 76 for determining a covariance CovDP between the measured and estimated instantaneous values PDi and PD*i of the pseudo-range for the satellite i.

The comparison module includes a sub-module 78 for verifying the measured value of the Doppler coefficient. The sub-module 78 is capable of comparing the value ΔDi to a threshold value ΔD0 and the value CovDi to a threshold value CovD0. When ΔDi is greater than ΔD0 and CovDi is greater than CovD0, the sub-module 78 is capable of giving the identifier i to the module 46 for updating the list of usable visible satellites LSVU.

The comparison module includes a sub-module 80 for verifying the measured value of the pseudo-range. The sub-module 80 is capable of comparing the value ΔPDi to a threshold value ΔPD0 and the value CovPDi to a threshold value CovPD0. When ΔPDi is greater than ΔPD0 and CovPDi is greater than CovPD0, the sub-module 80 is capable of giving the identifier i to the module 46 for updating the list of usable visible satellites LSVU.

The module 46 is capable of generating a list of usable visible satellites LSVU. To that end, the module 46 is capable of initializing the list of usable visible satellites from the list of visible satellites LSV at the output of the module 46 each time the latter is modified. The module 46 is next capable of deleting, from the list thus initialized, the identifier i of a satellite that is communicated to it by the sub-module 78 or the sub-module 80.

As input, the calculator 36 use the list LSVU generated at the output of the selector 34 to calculate the instantaneous kinematic state E(t) of the train 2 from only the signals coming from the satellites mentioned in the list LSVU.

The method for determining the instantaneous state E(t) of the train 2 resulting from the execution of the program 30 by the system 8 will now be described.

The execution of the program 30 begins with the execution 100 of the selector 34 to deliver a list of usable visible satellites LSVU.

In step 110, the execution of the selector 34 begins with the execution of the module 38. From the identifiers i of the visible satellites indicated by the module 16, the module 38 generates a list of visible satellites at the current moment LSV. Once a list LSV is generated, the module 46 initializes a list of usable visible satellites LSVU by copying the list of visible satellites LSV.

Then, in step 120, the calculation sub-module 50 is executed so as to calculate, for each satellite i of the list LSV, the measured instantaneous value Di of the Doppler coefficient, from the signal Si emitted by that satellite. In step 122, the sub-module 52 is executed to calculate, for each satellite i from the list LSV, a measured instantaneous value PDi of the pseudo-range, from the signal Si emitted by that satellite.

The sub-module 60 is next executed to generate an instantaneous estimated kinematic state E*(t) of the train 2.

In step 130, the sub-module 60 uses, as input, the kinematic state E(t−1) of the train determined at the preceding moment t−1. The sub-module 60 accesses the database 14 to read the mapping 24. Then, based on those two inputs, the sub-module 60 determines information relative to the portion of the track 4 on which the train 2 is traveling between t−1 and t.

In step 132, the dynamic model M of the sub-module 60 is used to determine an estimated kinematic state E*(t) of the train at the current moment t, from the kinematic state E(t−1) and the information relative to the portion of the track on which the train 2 is traveling.

In step 140, the execution of the estimator 60 continues with the execution of the sub-module 64 in order to calculate, for each satellite i from the list LSV, an estimated instantaneous value D*i of the Doppler coefficient. To that end, the instantaneous position and speed of the satellite i, calculated using the data contained in the ephemeris 21 stored in the database 14, and the estimated instantaneous position and speed of the train 2, P*(t) and V*(t), contained in the estimated kinematic state E*(t), are used to determine a relative position and speed between the satellite i and the train 2 in order to estimate the signals S*i received and deduce the value D*i therefrom.

Then, in step 142, the sub-module 66 is executed in order to calculate an estimated instantaneous value PD*i of the pseudo-range for each satellite i of the list LSV. To that end, the instantaneous position and speed of the satellite i, calculated from the data contained in the ephemeris 21 stored in the database 14, and the estimated instantaneous position and speed of the train 2, P*(t) and V*(t), contained in the estimated kinematic state E*(t), are used to determine the relative position and speed between the satellite i and the train 2 in order to estimate the signals S*i received and deduce the value PD*i therefrom.

Then, in step 150, corresponding to the execution of the sub-module 70 of the comparison module 44, the deviation ΔDi is calculated by difference between the measured and estimated instantaneous values, Di D*i, for the satellite i.

In step 152, corresponding to the execution of the sub-module 72, a covariance CovDi is calculated between the measured and estimated instantaneous values Di and D*i of the Doppler coefficient, for the satellite i.

In step 154, corresponding to the execution of the sub-module 74, a deviation ΔPDi is calculated by difference between the measured and estimated instantaneous values, PDi and PD*i, for the satellite i.

In step 156, corresponding to the execution of the sub-module 76, a covariance CovPDi between the measured and estimated instantaneous values, PDi and PD*i, for the satellite i.

In the comparison step 160 strictly speaking, executing the sub-module 78 makes it possible to verify that the value ΔDi is below a threshold deviation ΔD0 and the value CovDi is below a threshold value CovD0. In case of negative response, the identifier i is transmitted to the module 46.

In the step 162, similarly, executing the sub-module 80 makes it possible to verify that the value ΔPDi is below a threshold deviation ΔPD0 and the value CovPDi is below a threshold value CovPD0. In case of negative response, the identifier i is transmitted to the module 46.

Lastly, in step 170 for updating the list of usable visible satellites LSVU, the module 46 deletes the identifier i of a satellite transmitted to it at the end of step 160 or step 162 from the list LSVU initialized from the list LSV.

As input, the calculator 36 use the list LSVU generated at the output of the selector 34 to calculate the instantaneous kinematic state E(t) of the train 2 from only the signals coming from the satellites mentioned in the list LSVU.

Once the list LSVU has been generated, the step 200 for calculating the current instantaneous kinematic state E(t) is carried out only from the signals of the satellites indicated in the list LSVU.

The method advantageously takes advantage of the calculation of the Doppler coefficient or the pseudo-range, which are properties that fluctuate with a significant amplitude in case of disruption of the localization signal. Thus, if the amplitude of a measured value of either of these properties is high and varies considerably over time, that suggests that the corresponding localization system has been disrupted. The satellite transmitting this signal is then removed from the list of usable visible satellites for the subsequent calculation of the kinematic state of the vehicle.

Advantageously, the selection method is carried out quite far upstream so as to detect the disruption of a localization signal very quickly and avoid that disrupted signal being taken into account in the calculation of the kinematic state of the guided vehicle, which may have significant negative consequences.

What is claimed is:

1. A method for calculating, at a present moment, a kinematic state of a guided vehicle from signals emitted by a set of satellites from a constellation of localisation satellites, the method being performed by a programmed calculator on board the guided vehicle, the method comprising:
   selecting a set of usable visible satellites from among a set of visible satellites of a constellation of localisation satellites comprising, for each satellite of the set of visible satellites:
      calculating an instantaneous measured value for a quantity between a Doppler coefficient and a pseudo-range, from the signal received from said visible satellite;
      determining an instantaneous estimated value for the quantity, based on a dynamic model of the guided vehicle that uses only a kinematic state of the guided vehicle determined at a past moment to estimate an estimated kinematic state at the present moment and that uses a map of the track on which the guided vehicle moves;
      comparing the instantaneous measured and estimated values according to a criterion, and in case of non-compliance with the criterion; and
      deleting the satellite from a set of usable visible satellites; and
   calculating the kinematic state of the guided vehicle at the present moment only from the signals received from the satellites of the set of usable visible satellites.

2. The method as recited in claim 1 wherein the determining of an instantaneous estimated value for the quantity includes using an ephemeris making it possible to estimate a relative position and speed between one satellite of the set of visible satellites and the guided vehicle in the estimated kinematic state at the present moment.

3. The method as recited in claim 1 wherein the criterion used when comparing the instantaneous measured and estimated values is based on a deviation between the instantaneous measured and estimated values and/or a covariance between the instantaneous measured and estimated values.

4. The method as recited in claim 3 wherein the criterion includes verifying that the deviation is smaller than a threshold deviation and/or that the covariance is below a threshold covariance.

* * * * *